United States Patent [19]

Nakagawa et al.

[11] Patent Number: 5,238,091
[45] Date of Patent: Aug. 24, 1993

[54] BRAKE BAND FOR AUTOMATIC TRANSMISSION

[75] Inventors: Hideto Nakagawa, Aichi; Masashi Yamanaka, Toyota, both of Japan

[73] Assignee: Aisin Kako Kabushiki Kaisha, Aichi, Japan

[21] Appl. No.: 766,669

[22] Filed: Sep. 27, 1991

[30] Foreign Application Priority Data

Sep. 29, 1990 [JP] Japan ............................ 2-102445[U]
Sep. 29, 1990 [JP] Japan ............................ 2-102446[U]

[51] Int. Cl.⁵ ...................... F16D 51/04; F16D 65/78
[52] U.S. Cl. ............................ 188/77 W; 188/264 B
[58] Field of Search ................. 188/77 R, 77 W, 249, 188/250 H, 259, 218 R, 264 E, 264 B, 264 D; 192/107 T

[56] References Cited

U.S. PATENT DOCUMENTS

| | | | |
|---|---|---|---|
| 1,286,171 | 5/1917 | Cory | 188/259 |
| 1,529,828 | 12/1923 | Barlow | 188/259 |
| 1,591,582 | 3/1925 | Tucker | 188/259 |
| 1,978,687 | 10/1934 | Pearmain et al. | 192/107 T |
| 2,380,230 | 7/1945 | Gatke | 188/259 |
| 3,732,954 | 5/1973 | Heid | 188/259 |
| 4,023,656 | 5/1977 | Kuwahara et al. | 188/77 R |
| 5,135,082 | 8/1992 | Umezawa et al. | 188/77 R |

FOREIGN PATENT DOCUMENTS

| | | |
|---|---|---|
| 260111 | 9/1988 | German Democratic Rep. . |
| 63-135031 | 5/1988 | Japan . |
| 6387137 | 12/1990 | Japan . |
| 928115 | 5/1982 | U.S.S.R. . |
| 2125125 | 2/1984 | United Kingdom . |

Primary Examiner—Robert J. Oberleitner
Assistant Examiner—Chris Schwartz
Attorney, Agent, or Firm—Oblon, Spivak, McClelland, Maier & Neustadt

[57] ABSTRACT

Disclosed is a brake band which includes a band and a lining connected to an inner peripheral surface of the band. The lining includes a plurality of grooves in its inner peripheral surface, the grooves which extend from an end to another end of the lining in an axial direction of a drum, rotating either in a clockwise direction or in a counter clockwise direction, obliquely with respect to an axial direction and a circumferential direction of the lining. The grooves include a communication passage which communicates an inner peripheral surface of the lining with the outside and which is disposed at a leading end of the grooves with respect to the clockwise rotational direction of the drum, and a trailing end of the grooves with respect to the clockwise rotational direction of the drum is disposed an inside of the another end of the lining. The brake band has a high cooling efficiency when the drum rotates in the clockwise direction. When the drum rotates in the counterclockwise direction, the oil is flowed to the trailing ends of the grooves, and it is blocked by the trailing ends. Accordingly, the oil is thus held in the grooves, and it is leaked gradually between the drum and the lining in a sufficient amount. Therefore, the brake band maintains the high cooling efficiency, and it inhibits the judder from occurring even when the drum rotates in the counterclockwise direction.

7 Claims, 6 Drawing Sheets

BRAKE BAND FOR AUTOMATIC TRANSMISSION

BACKGROUND OF THE INVENTION

1. Field of the Invention

The present invention relates to a brake band which is employed in a wet type band brake apparatus for an automatic transmission of an automobile or the like.

2. Description of the Related Art

A band brake apparatus for an automatic transmission gives a higher static torque capacity than a multi-plate brake apparatus having the same dimension does. Since the band brake apparatus gives different torque capacities in directions for braking a drum, it gives a favorable transmission characteristic as a releasing element in an up-shift operation. Hence, the band brake apparatus has been used widely as a reaction force element. In such a band brake apparatus, a drum is braked by pressing a brake band to the drum. The band brake is one which is illustrated in FIG. 17.

For instance, the conventional brake band comprises a band 100 which is made of metal and which is wound in a ring shape, and a tape-shaped lining 200 which is connected to an inner peripheral surface of the band 100, as illustrated in FIG. 17. The band 100 is provided with a plurality of oil holes 101 which penetrates to the outside, and it is also provided with brackets 102 and 103, to which a tightening force acts, at its both ends. Further, in this conventional brake band, two linings 200 are disposed parallelly at a predetermined interval. Furthermore, a groove 201 is formed between the two linings 200 so as to expose the oil holes 101.

In a band brake apparatus which employs the conventional brake band, oil is supplied between the drum and the linings 200 by way of an outer peripheral surface of the drum. Thus, lubrication is carried out during braking operation, and heat generated by friction is cooled down. The oil which has deprived the heat and which is heated accordingly is expelled to the outside through the oil holes 101.

Recently, an automatic transmission has been downsized and an engine has been improved to a higher output one. Accordingly, a brake band has come to be used in a harsher environment. Namely, a sliding speed between the drum and the lining has increased to a higher speed, and consequently a frictional force which acts on the lining has increased. As a result, it is necessary to improve the heat resistance of the lining. Here, it is effective to improve the cooling efficiency of the oil in order to improve the heat resistance of the lining.

In Japanese Unexamined Utility Model Publication (KOKAI) No. 135,031/1988, for instance, a brake band is proposed. The brake band includes a lining including grooves which extend in an axial direction of a drum as well.

In addition, the applicant of the present invention disclosed a brake band in Japanese Unexamined Utility Model Publication (KOKAI) No. 87,137/1990. The brake band includes inclined grooves in an inner peripheral surface of a lining, and it includes oil holes which are disposed at both ends of the grooves and which penetrate to the outside. By communicating the grooves with the oil holes in this manner, the oil heated by a frictional heat can be expelled to the outside smoothly. Hence, the heat resistance of the lining is improved remarkably.

The applicant of the present invention has kept on developing the brake band which is disclosed in Japanese Unexamined Utility Model Publication (KOKAI) No. 87,137/1990 further, and the applicant has found that there sometimes occurs the judder during engine braking.

SUMMARY OF THE INVENTION

The present invention improves the brake band which is disclosed in Japanese Unexamined Utility Model Publication (KOKAI) No. 87,137/1990 further. It is therefore an object of the present invention to provide a novel brake band which maintains the cooling efficiency of our preceding brake band and which inhibits the judder.

We, the inventors of the present invention, have been investigating the cause of the judder earnestly, and we have found that the judder occurs when a drum rotates in a direction opposite to a tightening direction of a brake band. To be specific, when the drum rotates in a clockwise direction, a frictional force is exerted between the drum and the brake band so as to further tighten the brake band. On the other hand, when the drum rotates in a counterclockwise direction, the frictional force is exerted in the opposite direction so as to require a longer time for the braking operation than the case where the drum rotates in the clockwise direction. As a result, the oil is supplied in an insufficient amount, and accordingly vibrations are caused by torque fluctuations. Thus, there sometimes occurs the judder. The inventors have come to think of supplying oil in amounts which are varied for the clockwise rotation of the drum and for the counterclockwise rotation of the drum, and consequently the inventors have completed the present invention.

Specifically speaking, there is provided a brake band according to the present invention, which comprises:

a band made of metal and wound in a ring shape; and a tape-shaped lining connected to an inner peripheral surface of the band and extending in a circumferential direction of the band;

whereby the brake band is adapted for being brought into sliding contact with a drum, which rotates either in a clockwise direction or in a counterclockwise direction, by way of oil which is supplied between the drum and the lining when the lining is pressed to an outer peripheral surface of the drum;

the lining including a plurality of grooves in an inner peripheral surface thereof, the grooves extending from an end to another end of the lining in an axial direction of the drum obliquely with respect to an axial direction of the lining and a circumferential direction of the lining, the grooves including a communication passage which communicates an inner peripheral surface of the lining with the outside (i.e., of an outer periphery of the lining) and which is disposed at a leading end of the grooves with respect to the clockwise rotational direction of the drum, the clockwise rotational direction being a tightening direction of the band, and a trailing end of the grooves with respect to the clockwise rotational direction of the drum disposed an inside of the another end of the lining.

Major features of the brake band according to the present invention lie in the lay-out and the configuration of the grooves in the lining, and in the grooves which have the communication passage. Namely, the lining includes a plurality of the grooves in an inner peripheral surface thereof. The grooves extend from an end to another end of the lining in an axial direction of the drum obliquely with respect to an axial direction of the lining and a circumferential direction of the lining. Further, the grooves include the communication passage which communicates an inner peripheral surface of the lining with the outside of the lining, or in other words to the outer periphery of the lining. The communication passage is disposed at a leading end of the grooves with respect to the clockwise rotational direction of the drum, the clockwise rotational direction which is a tightening direction of the band. Furthermore, a trailing end of the grooves is disposed at or adjacent an inside of the cross-directional or axial end of the lining.

As later described in the operation of the brake band, with the above-described constructions, the heated oil can be quickly expelled through the communication passages when the drum rotates in the clockwise direction. Hence, the cooling efficiency of the oil is improved, and accordingly the braking operation can be carried out quickly. Since the trailing ends of the grooves are disposed at an inside of the cross-directional end of the lining, the trailing ends of the grooves work as dams so as to hold the oil in an amount which is enough for the braking operation when the drum rotates in the counterclockwise direction. Hence, the torque is inhibited from fluctuating, and accordingly the judder is inhibited from occurring.

As for a material for the lining, it is possible to use the conventional material, such as a metallic material, a semi-metallic material, a paper material or the like. In particular, the paper material is recommended especially, because it is superior in the frictional characteristic, because it is light and less expensive, because it absorbs a large amount of oil due to its porosity, and because it is superior in the heat resistance as well as the wear resistance. A thickness and a configuration of the lining can be constructed similarly to the conventional lining. Moreover, the band made of metal can be the conventional band.

The present brake band thus constructed operates as follows. When the drum rotates in the clockwise direction and when the brake band is pressed to the drum, the oil which is supplied between an outer peripheral surface of the drum and an inner peripheral surface of the lining is moved in the rotational direction of the drum as the drum rotates. Namely, the oil is moved in the clockwise rotational direction of the drum, it is passed through the grooves, and then it is expelled to the outside through the communication passages which are disposed at leading ends of the grooves with respect to the clockwise rotational direction of the drum. Accordingly, the oil is spread all over the entire lining surface uniformly, and it is expelled quickly. Therefore, the brake band has a high cooling efficiency, and it is inhibited from wearing and seizing. During the braking operation, since the frictional force exerted between the drum and the lining works to further tighten the brake band, the braking operation is carried out quickly.

On the other hand, when the drum rotates in the counterclockwise direction, the frictional force works in a direction opposite to the tightening direction of the brake band. Hence, the tightening torque decreases. Accordingly, it takes longer to carry out the braking operation than the case where the drum rotates in the clockwise direction. As a result, it is necessary to supply the cooling oil in a larger amount. When such is the case, the oil is flowed to the trailing ends of the grooves with respect to the clockwise rotational direction of the drum. Since the trailing ends of the grooves are disposed an inside of the cross-directional end of the lining in the present brake band, and since the trailing ends do not communicate with the outside, the trailing ends work as dams so as to hold the oil temporarily in the grooves. The oil thus held in the grooves is leaked gradually between the drum and the lining when the drum and the lining are engaged. Thus, the oil is provided therebetween in a sufficient amount. Therefore, the torque is inhibited from fluctuating during the frictional engagement, and accordingly the vibrations as well as the judder are inhibited from occurring.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIGS. 1 through 3 relate to a brake band of a First Preferred Embodiment according to the present invention, wherein:

FIG. 1 is a perspective view of the brake band;

FIG. 2 is a development view of a major portion of a lining of the brake band; and FIG. 3 is a cross sectional view of the lining taken along line "II—II" of FIG. 2;

FIGS. 11 through 13 relate to a brake band of a Seventh Preferred Embodiment according to the present invention, wherein:

FIG. 11 is a perspective view of the brake band;

FIG. 12 is a development view of a major portion of a lining of the brake band; and FIG. 13 is a cross sectional view of the lining taken along line "XII—XII" of FIG. 12;

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The present invention will be hereinafter described with reference to preferred embodiments. The preferred embodiments are applications of the present to a brake band which is employed in a band brake apparatus for an automobile automatic transmission.

First Preferred Embodiment

Figure 1:
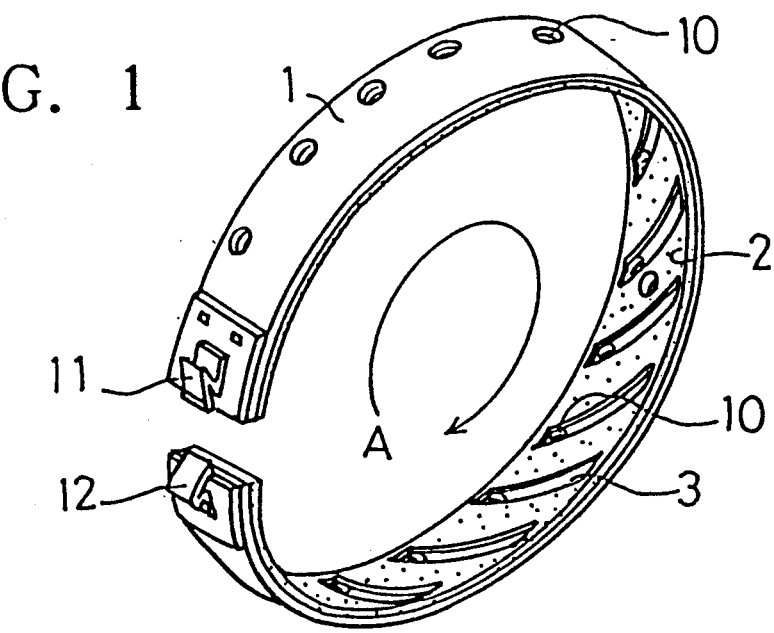

FIG. 1 illustrates an overall perspective view of a brake band of a First Preferred Embodiment according to the present invention. The brake band comprises a band 1 which is made of steel and which is wound in a ring shape, and a lining 2 connected to an inner peripheral surface of the band 1. Brackets 11 and 12 are fixed at both ends of the band 1, and they are subjected to a tightening force.

Figure 2:
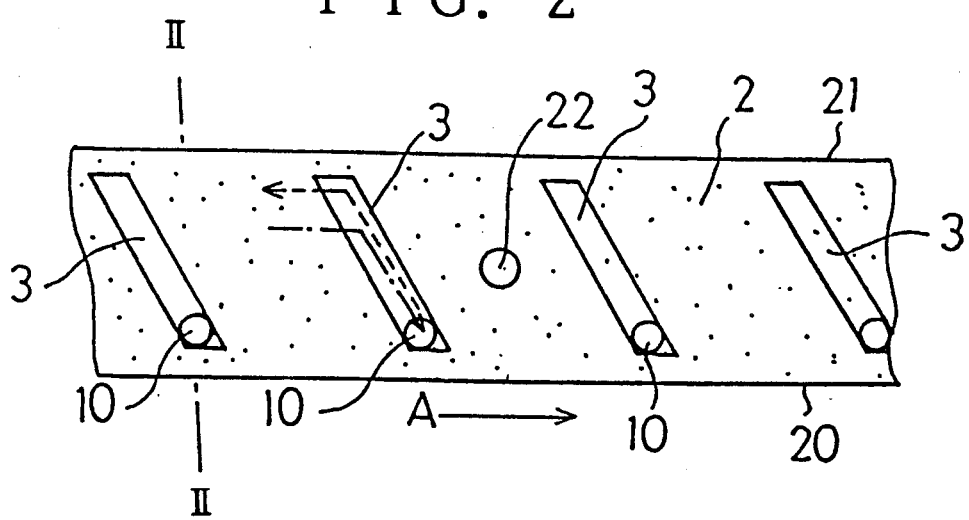
Figure 3:
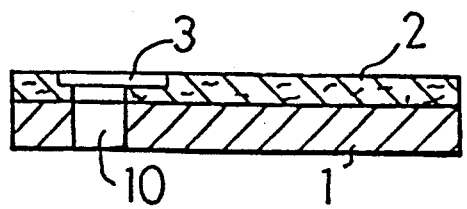

FIG. 2 illustrates a development view of the lining 2, and FIG. 3 illustrates a cross sectional view of the lining 2 taken along line "II—II" of FIG. 2. As shown in FIG. 2, the lining 2 includes a plurality of grooves 3 formed therein. The grooves 3 extend from one cross-directional end 20 to the other cross-directional end 21 of the lining 2 in an axial direction of a drum (not shown) obliquely with respect to an axial direction (or cross-directional) of and a circumferential direction of the lining 2 at an angle of approximately 45° respectively. The axial direction of the lining 2 herein means a longitudinal direction of the lining 2 in FIG. 2 or an axial direction of the drum around which the brake band is disposed, and the circumferential direction of the lining 2 herein means a lateral direction of the linings 2 in FIG. 2. Further, the grooves 3 do not communicate with the cross-directional end 20 and the other cross-directional end 21 of the lining 2, they have a depth of approximately ⅔ of a thickness of the lining 2, and they are disposed periodically in the circumferential direction of the lining 2. Furthermore, an oil hole 10 is formed at ends of the grooves 3 which are disposed on a side of the cross-directional end 20 of the lining 2. The oil holes 10 penetrate through the lining 2 and the band 1. Moreover, the lining 2 includes a positioning hole 22 which is formed at a central portion thereof in the axial and circumferential directions thereof. The positioning hole 22 is aligned with a positioning hole (not shown) formed in the band 1, and a positioning pin or the like is inserted into the positioning holes, thereby determining a position which enables to connect the band 1 and the lining 2 as designed.

The lining 2 is formed of a paper material. The paper material comprises cellulose fibers and asbestos which are bonded with a phenol resin. The lining 2 has a tape shape which has a thickness of 1 mm, a width of 40 mm and a length of 460 mm. The grooves 3 have a width of 4 mm, and they are disposed at intervals of 66 mm. Thus, opening areas of the grooves 3 occupy 7.2% of a surface area of the lining 2 in total. In addition, the lining 2 is bonded to the band 1 with a modified acrylonitrile adhesive so that the direction shown by the arrow "A" of FIG. 2 agrees with the clockwise rotational direction of the drum shown by the arrow "A" of FIG. 1.

Oil flows during braking operations will be hereinafter described. An oil flow during the clockwise rotation of the drum is specified by the arrow which is shown by alternate long and short dash lines of FIG. 2. An oil flow during the counterclockwise rotation of the drum is specified by the arrow which is shown by broken lines of FIG. 2. The oil flows are hereinafter specified similarly throughout the rest of the drawings.

In the thus constructed brake band, the oil is flowed on the surface of the lining 2 in the direction of the arrow "A" of FIG. 2 when braking the drum which rotates in the clockwise direction shown by the arrow "A" of FIG. 1. The oil is then entered into the grooves 3, and it is flowed to the leading ends of the grooves 3 with respect to the direction of the arrow "A" of FIG. 2, the leading ends which are disposed on the cross-directional end 20 side of the lining 2. Consequently, the oil is expelled to the outside through the oil holes 10. Accordingly, the oil is spread all over the entire surface of the lining 2 uniformly. Therefore, the brake band has a high cooling efficiency, and it is superior in the heat resistance.

On the other hand, the oil is flowed on the surface of the lining 2 in the direction opposite to the direction of the arrow "A" of FIG. 2 when braking the drum which rotates in the counterclockwise direction. The oil is then entered into the grooves 3, and it is flowed to the trailing ends of the grooves 3 with respect to the direction of the arrow "A" of FIG. 2, the trailing ends which are disposed on the other cross-directional end 21 side of the lining 2. However, no oil hole is provided at the trailing ends of the grooves 3. Consequently, the oil is held in the grooves 3, and it is leaded to the surface of the lining 2 gradually. Accordingly, the oil is provided between the lining 2 and the drum in a sufficient amount even when it takes longer to carry out the braking operation. Therefore, the torque is inhibited from fluctuating.

Figure 10:
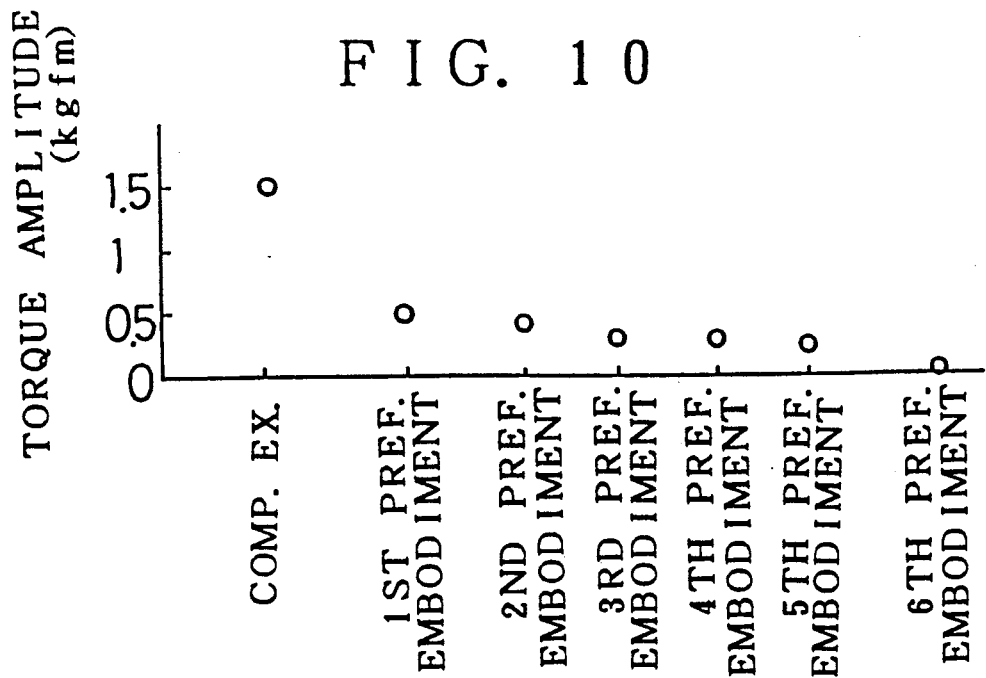
FIG. 10 is a plot which illustrates results of a measurement on torque amplitudes which were exhibited by the band brakes of the First through Sixth Preferred Embodiments and the Comparative Example.

In order to verify the above-described performances of the brake band of the First Preferred Embodiment, the brake band was installed and tested on an SAE No. 2 testing machine. The brake band was evaluated for its amplitude of the torque fluctuation when it is engaged with the drum under the following conditions. The results of the evaluation are illustrated in FIG. 10:

Direction of the Drum Rotation: Direction opposite to the direction specified by the arrow "A" of FIG. 1;
"N," Number of Drum Revolutions: 2,000 rpm;
"F," Tightening Force: 40 kgf; and
Oil Temperature: 40° C.

Second Preferred Embodiment

Figure 4:
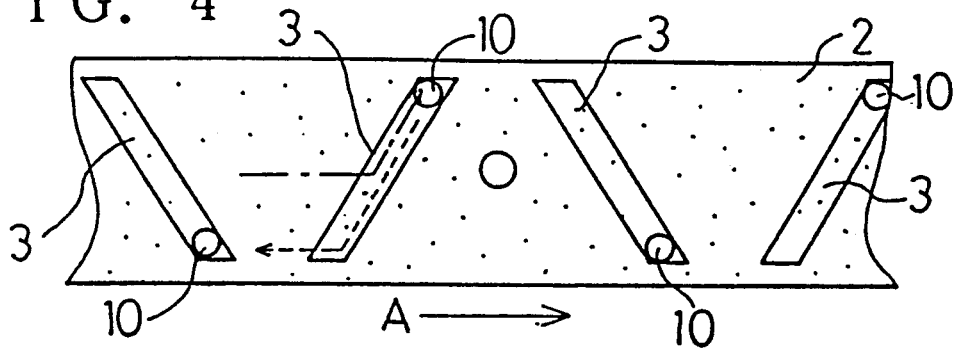
FIG. 4 relates to a brake band of a Second Preferred Embodiment according to the present invention, and it is a development view of a major portion of a lining of the brake band.

FIG. 4 illustrates a development view of a brake band of a Second Preferred Embodiment according to the present invention. The brake band of the Second Preferred Embodiment is identical with that of the First Preferred Embodiment other than that the grooves 3 of the lining 2 are disposed alternately in different oblique directions with respect to the axial direction and the circumferential direction of the lining 2.

Since the oil holes 10 are distributed uniformly on the both sides in the width-wise direction (i.e., the axial direction) of the lining 2 in the brake band of the Second Preferred Embodiment, the torque can be exerted further uniformly during the braking operations. This brake band was evaluated similarly as the brake band of the First Preferred Embodiment. The results of the evaluation are also illustrated in FIG. 10.

Third Preferred Embodiment

Figure 5:
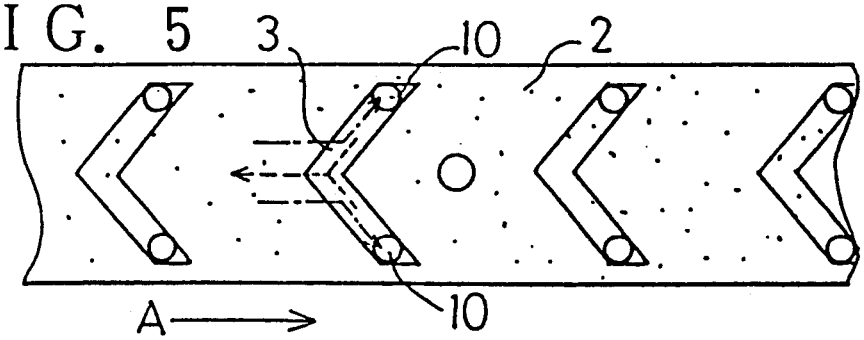
FIG. 5 relates to a brake band of a Third Preferred Embodiment according to the present invention, and it is a development view of a major portion of a lining of the brake band.

FIG. 5 illustrates a development view of a brake band of a Third Preferred Embodiment according to the present invention. The brake band of the Third Preferred Embodiment is identical with that of the First Preferred Embodiment other than that the lining 2 includes the grooves 3 which are formed in a letter "V" shape. The letter "V" shape expands in the direction of the arrow "A" of FIG. 5. Namely, the letter "V" shape is disposed along the clockwise rotational direction of the drum (i.e., in the direction of the arrow "A" of FIG. 5) so that an apex of the letter "V" shape trails fork ends thereof in the clockwise rotational direction of the drum. Further, the grooves 3 include oil holes 10 which are disposed at both fork ends of the letter "V" shape.

In the brake band of the Third Preferred Embodiment, the oil can be supplied at a central portion of the lining 2 in the width-wise direction of the lining 2 concentratedly during the braking operation of the drum which rotates in the counterclockwise direction. This brake band was evaluated similarly as the brake band of the First Preferred Embodiment. The results of the evaluation are also illustrated in FIG. 10.

Fourth Preferred Embodiment

Figure 6:
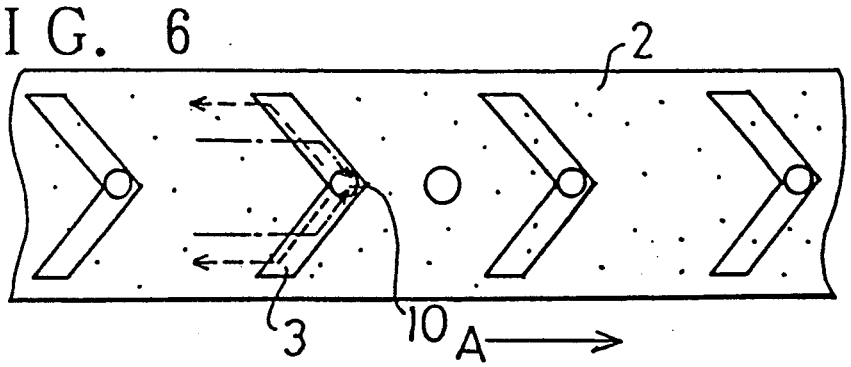
FIG. 6 relates to a brake band of a Fourth Preferred Embodiment according to the present invention, and it is a development view of a major portion of a lining of the brake band.

FIG. 6 illustrates a development view of a brake band of a Fourth Preferred Embodiment according to the present invention. The brake band of the Fourth Preferred Embodiment is identical with that of the First Preferred Embodiment other than that the lining 2 includes the grooves 3 which are formed in a letter "V" shape. The letter "V" shape contracts in the direction of the arrow "A" of FIG. 6. Namely, the letter "V" shape is disposed along the counterclockwise rotational direction of the drum (i.e., in the direction opposite to the direction of the arrow "A" of FIG. 6) so that an apex of the letter "V" shape trails fork ends thereof in the counterclockwise rotational direction of the drum. Further, the grooves 3 include an oil hole which is disposed at the apex of the letter "V" shape.

In the brake band of the Fourth Preferred Embodiment, the oil can be supplied around both ends of the lining 2 in the width-wise direction of the lining 2 concentratedly during the braking operation of the drum which rotates in the counterclockwise direction. This brake band was evaluated similarly as the brake band of the First Preferred Embodiment. The results of the evaluation are also illustrated in FIG. 10.

Fifth Preferred Embodiment

Figure 7:
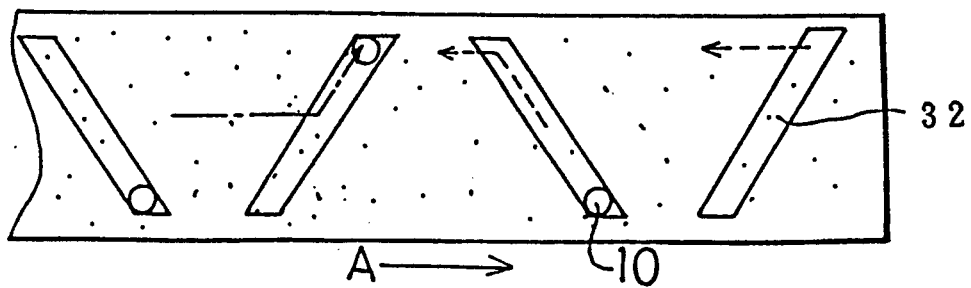
FIG. 7 relates to a brake band of a Fifth Preferred Embodiment according to the present invention, and it is a development view of a major portion of a lining of the brake band.

FIG. 7 illustrates a development view of a brake band of a Fifth Preferred Embodiment according to the present invention. The brake band of the Fifth Preferred Embodiment is an improved version of the Second Preferred Embodiment, and it identical with that of the First Preferred Embodiment other than that a groove 32 does not include an oil hole. The groove 32 is disposed at a circumferential end of the lining 2. The circumferential end of the lining 2 is adapted to be its driven end. Namely, the driven end of the lining 2 is a trailing circumferential end of the lining 2 with respect to the direction of the arrow "A" of FIG. 1. More particularly, the driven end of the lining 2 is positioned adjacent either to the bracket 11 or 12 shown in FIG. 1.

In the brake band of the Fifth Preferred Embodiment, the oil can be reserved at the driven end of the lining 2 to which a particularly large load is applied. As a result, the overall torque fluctuation can be made further uniform. This brake band was evaluated similarly as the brake band of the First Preferred Embodiment. The results of the evaluation are also illustrated in FIG. 10.

Sixth Preferred Embodiment

Figure 8:
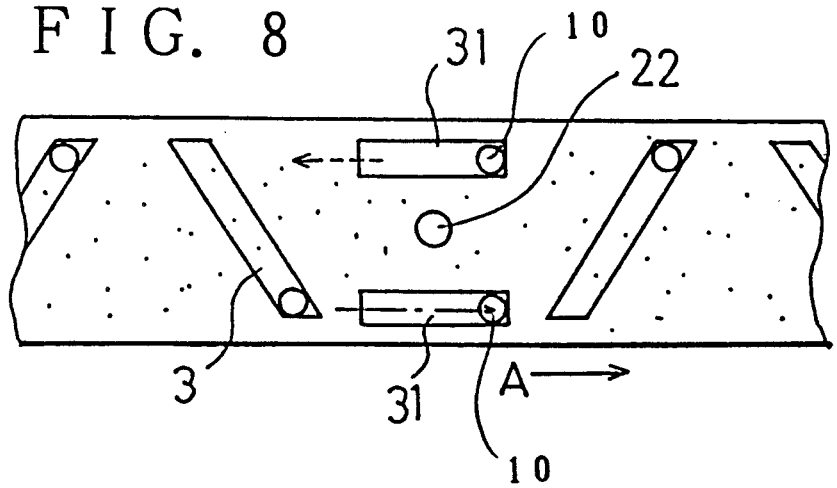
FIG. 8 relates to a brake band of a Sixth Preferred Embodiment according to the present invention, and it is a development view of a major portion of a lining of the brake band.

FIG. 8 illustrates a development view of a brake band of a Sixth Preferred Embodiment according to the present invention. The brake band of the Sixth Preferred Embodiment is also an improved version of the Second Preferred Embodiment. Namely, it might be slightly hard to form the grooves 3 on both sides of the positioning hole 22 in the brake band of the Second Preferred Embodiment, and it might be slightly hard to supply a sufficient amount of oil to the area around the positioning groove 22.

Hence, the brake band of the Sixth Preferred Embodiment includes a pair of straight grooves 31 and 31 which are disposed on both sides of the positioning hole 22 with respect to the longitudinal direction of the lining 2 and which are formed in the lining 2 so as to extend in the lateral direction of the lining 2. Further, oil holes 10 are formed at leading ends of the grooves 31 with respect to the direction of the arrow "A" of FIG. 8. Accordingly, in this brake band, the oil can be supplied smoothly to the area where the positioning hole 22 is formed. As a result, the torque fluctuation can be made further uniform. This brake band was evaluated similarly as the brake band of the First Preferred Embodiment. The results of the evaluation are also illustrated in FIG. 10.

Comparative Example

Figure 9:
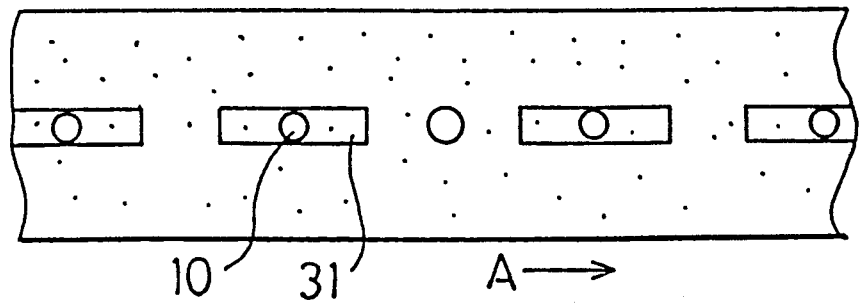
FIG. 9 is a development view of a major portion of a lining of a brake band of a Comparative Example.

FIG. 9 illustrates a development view of a brake band of a Comparative Example. The brake band of the Comparative Example does not include the grooves 3 which extend obliquely in the lining 2, but it includes a plurality of straight grooves 31 which extend in the lateral direction of lining 2 and which are formed in series at intervals in the lateral direction. Further, oil holes 10 are formed at central portions of the grooves 31.

The brake band of the Comparative Example was evaluated similarly as the brake band of the First Preferred Embodiment. The results of the evaluation are also illustrated in FIG. 10.

Evaluation

When the torque amplitude is 1 kgfm or less, it has been known that the torque amplitude is not actually felt as irritating vibrations by a passenger of an automobile. It is apparent from FIG. 10 that the brake bands of the First through Sixth Preferred Embodiments exhibited remarkably less torque amplitudes than that of the Comparative Example did, and that the torque amplitudes were 0.5 kgfm or less. Hence, the brake bands did not cause the judder. In addition, it is also appreciated from FIG. 10 that the brake band of the Second Preferred Embodiment exhibited less fluctuating torque amplitude than that of the First Preferred Embodiment did, and that the brake bands of the Fifth and Sixth Preferred Embodiments exhibited much less fluctuating torque amplitude than that of the Second Preferred Embodiment did. It is readily understood that these favorable phenomena result from the uniformized oil flow, one of the advantageous effects of the present invention.

Seventh Preferred Embodiment

Figure 11:
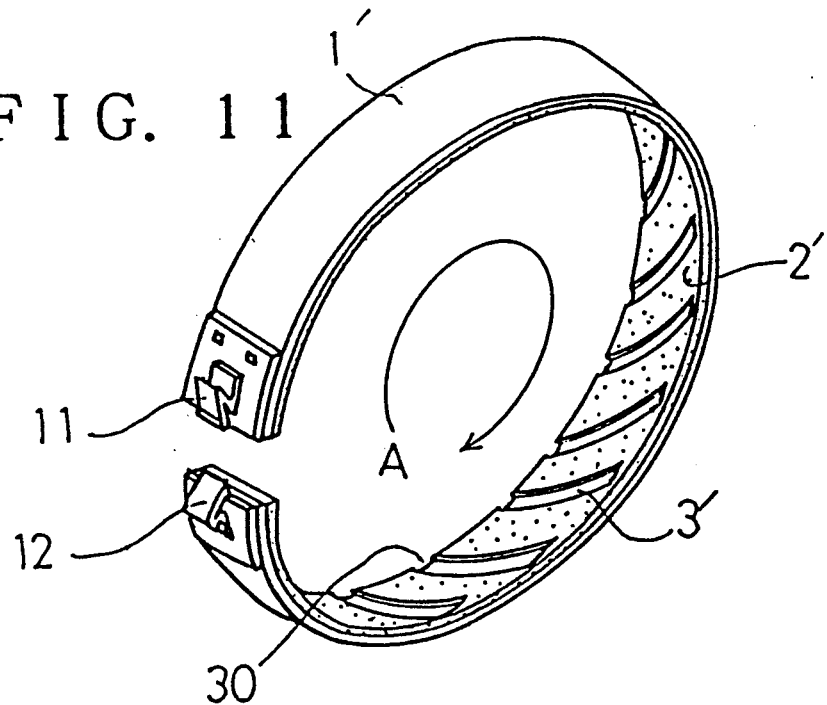

FIG. 11 illustrates an overall perspective view of a brake band of a Seventh Preferred Embodiment according to the present invention. The brake band has an identical construction with that of the First Preferred Embodiment basically. However, it differs therefrom in that its band 1' is free from the oil holes 10, and in that its lining 2' includes grooves 3' of a different construction.

Figure 12:
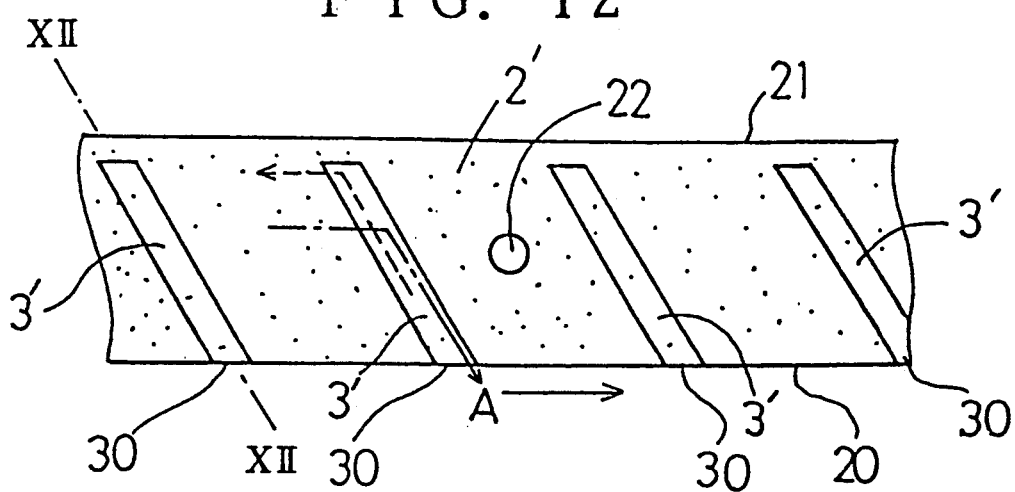
Figure 13:
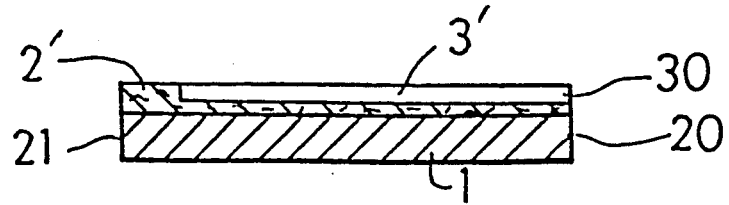

FIG. 12 illustrates a development view of the lining 2' of the brake band of the Seventh Preferred Embodiment, and FIG. 13 illustrates a cross sectional view of the lining 2' taken along line "XII—XII" of FIG. 12. As shown in FIG. 12, the lining 2' includes a plurality of the grooves 3' formed therein. The grooves 3' extend from a cross-directional end 20 to another end 21 of the lining 2' in an axial direction of a drum (not shown) obliquely with respect to an axial direction and a circumferential direction of the lining 2' at an angle of approximately 45° respectively. Further, the grooves 3' open to an cross-directional end surface of the lining 2' at the end 20, and they do not reach another end surface of the lining 2' at the another end 21. Furthermore, the grooves 3' have a depth of approximately ⅔ of a thickness of the lining 2', and they are disposed periodically in the circumferential direction of the lining 2. In addition, as shown in FIG. 13, the grooves 3' communicate with the outside at their openings 30 which are disposed at the cross-directional end 20 side of the lining 2'.

In the thus constructed brake band, the oil is flowed on the surface of the lining 2' in the direction of the arrow "A" of FIG. 12 when braking the drum which rotates in the clockwise direction shown by the arrow "A" of FIG. 11. The oil is then entered into the grooves 3', and it is flowed to the openings 30 which are disposed at the cross-directional end 20 side of the lining 2'. Consequently, the oil is expelled to the outside through the openings 30. Accordingly, the oil is spread all over the entire surface of the lining 2' uniformly. Therefore, the brake band has a high cooling efficiency, and it is superior in the heat resistance.

On the other hand, the oil is flowed on the surface of the lining 2' in the direction opposite to the direction of the arrow "A" of FIG. 12 when braking the drum which rotates in the counterclockwise direction. The oil is then entered into the grooves 3', and it is flowed to the other ends (i.e., the closed ends) of the grooves 3' which are disposed on the other cross-directional end 21 of the lining 2'. However, no openings are provided at the another ends of the grooves 3'. Consequently, the oil is held in the grooves 3', and it is leaked to the surface of the lining 2' gradually. Accordingly, the oil is provided between the lining 2' and the drum in a sufficient amount even when it takes longer to carry out the braking operation. Therefore, the torque is inhibited from fluctuating.

Figure 16:
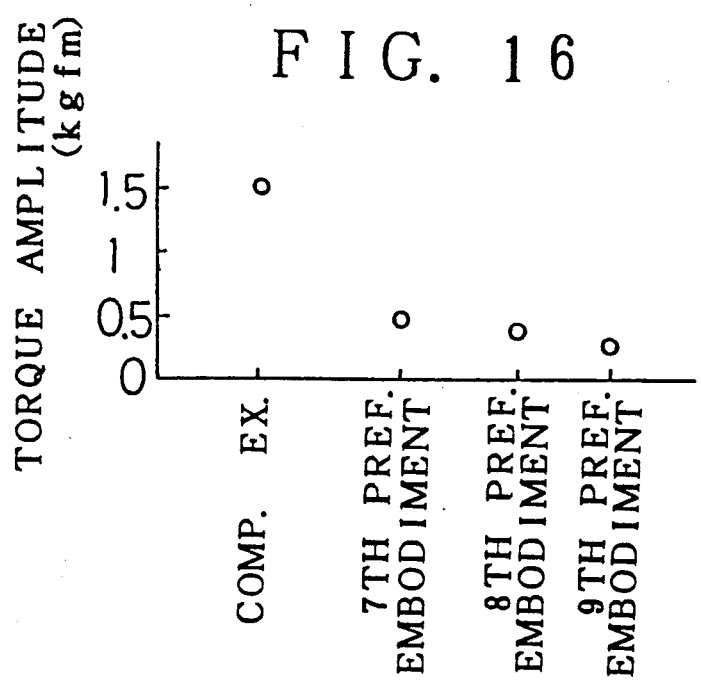
FIG. 16 is a plot which illustrates results of a measurement on torque amplitudes which were exhibited by the band brakes of the Seventh through Ninth Preferred Embodiments and the Comparative Example.
Figure 17:
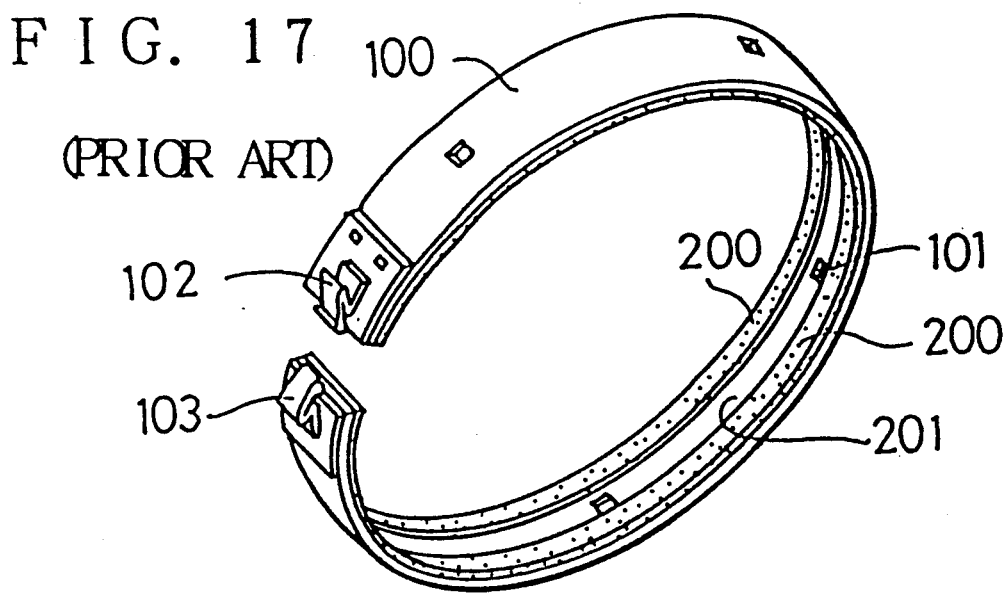
FIG. 17 is a perspective view of a conventional brake band.

In order to verify the above-described performances of the brake band of the Seventh Preferred Embodiment, the brake band was evaluated similarly as the brake band of the First Preferred Embodiment. The results of the evaluation are illustrated in FIG. 16.

Eighth Preferred Embodiment

Figure 14:
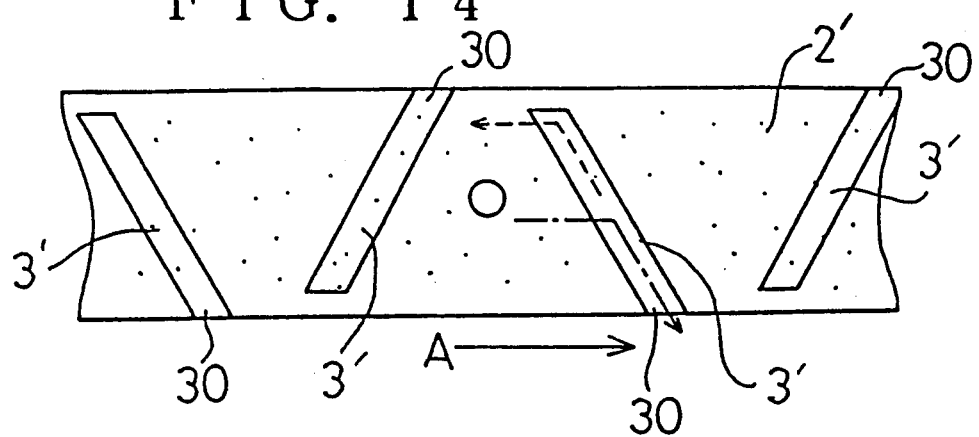
FIG. 14 relates to a brake band of an Eighth Preferred Embodiment according to the present invention, and it is a development view of a major portion of a lining of the brake band.

FIG. 14 illustrates a development view of a brake band of an Eighth Preferred Embodiment according to the present invention. The brake band of the Eighth Preferred Embodiment is identical with that of the Seventh Preferred Embodiment other than that the grooves 3' of the lining 2' are disposed alternately in different oblique directions with respect to the axial direction and the circumferential direction of the lining 2'.

Since the openings 30 are distributed uniformly on the both sides in the width-wise direction (i.e., in the axial direction) of the lining 2' in the brake band of the Eighth Preferred Embodiment, the torque can be exerted further uniformly during the braking operations. This brake band was evaluated similarly as the brake band of the First Preferred Embodiment. The results of the evaluation are also illustrated in FIG. 16.

Ninth Preferred Embodiment

Figure 15:
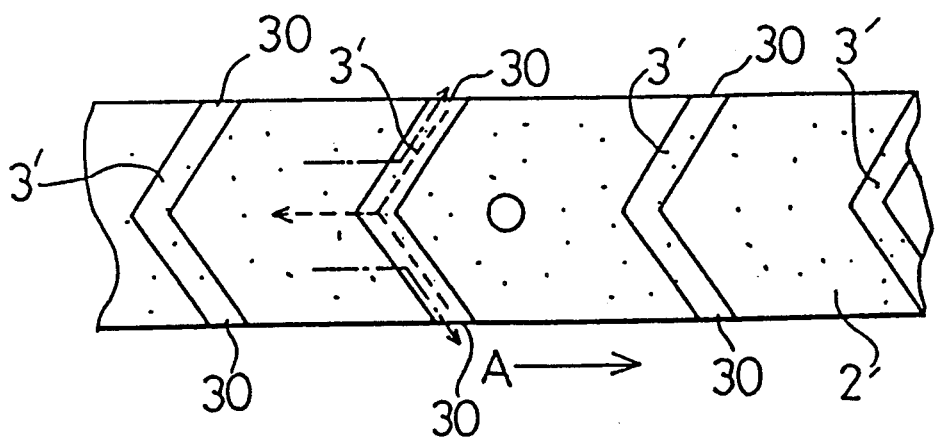
FIG. 15 relates to a brake band of a Ninth Preferred Embodiment according to the present invention, and it is a development view of a major portion of a lining of the brake band.

FIG. 15 illustrates a development view of a brake band of a Ninth Preferred Embodiment according to the present invention. The brake band of the Ninth Preferred Embodiment is identical with that of the Seventh Preferred Embodiment other than that the lining 2' includes the grooves 3' which are formed in a letter "V" shape. The letter "V" shape expands in the direction of the arrow "A" of FIG. 15. Namely, the letter "V" shape is disposed along the clockwise rotational direction of the drum (i.e., in the direction of the arrow "A" of FIG. 15) so that an apex of the letter "V" shape trails fork ends thereof in the clockwise rotational direction of the drum. Further, the grooves 3' include openings 30 which are disposed at both fork ends of the letter "V" shape.

In the brake band of the Ninth Preferred Embodiment, the oil can be supplied at a central portion of the lining 2' in the width-wise direction of the lining 2' concentratedly during the braking operation of the drum which rotates in the counterclockwise direction. This brake band was evaluated similarly as the brake band of the First Preferred Embodiment. The results of the evaluation are also illustrated in FIG. 16. For comparison, FIG. 16 also contains the results of the evaluation on the brake band of the Comparative Example which is shown in FIG. 9.

Evaluation

As mentioned earlier, when the torque amplitude is 1 kgfm or less, it has been known that the torque amplitude is not actually felt as irritating vibrations by a passenger of an automobile. It is apparent from FIG. 16 that the brake bands of the Seventh through Ninth Preferred Embodiments exhibited remarkably less torque amplitudes than that of the Comparative Example did, and that the torque amplitudes were 0.5 kgfm or less. Hence, the brake bands did not cause the judder. In addition, it is also appreciated from FIG. 16 that the brake band of the Eighth Preferred Embodiment exhibited less fluctuating torque amplitude than that of the Seventh Preferred Embodiment did, and that the brake band of the Ninth Preferred Embodiment exhibited much less fluctuating torque amplitude than that of the Eighth Preferred Embodiment did. It is readily understood that these favorable phenomena result from the uniformized oil flow, one of the advantageous effects of the present invention.

Having now fully described the present invention, it will be apparent to one of ordinary skill in the art that many changes and modifications can be made thereto without departing from the spirit or scope of the present invention as set forth herein including the appended claims.

What is claimed is:

1. A brake band, comprising:
a band made of metal and wound in a ring shape; and
a tape-shaped lining connected to an inner peripheral surface of said band and extending in a circumferential direction of said band;
whereby said brake band is adapted for being brought into sliding contact with a drum, which rotates in a clockwise direction and in a counterclockwise direction, by way of oil which is supplied between the drum and said lining when said lining is pressed to an outer peripheral surface of the drum;
said lining including a plurality of individual grooves in an inner peripheral surface thereof, the individual grooves extending obliquely with respect to a circumferential direction and a cross-direction of said lining, the individual grooves including a communication passage which communicates an inner peripheral surface of said lining with an outside of an outer periphery of said lining and wherein said communication passage is disposed at a leading end of said individual grooves with respect to said clockwise rotational direction of said drum, and said individual grooves having a trailing end disposed adjacent and inside of a first cross-directional end of said lining.

2. The brake band according to claim 1, wherein said communication passage is an oil hole which penetrates through said lining and said band.

3. The brake band according to claim 2, wherein said grooves are formed in a letter "V" shape which is disposed along said counterclockwise rotational direction of said drum so that an apex of the letter "V" shape trails fork ends thereof in said counterclockwise rotational direction of said drum, and include an oil hole which is disposed at the apex of the letter "V" shape.

4. The brake band according to claim 1, wherein said grooves are disposed parallel each other.

5. The brake band according to claim 1, wherein neighboring grooves of said grooves extend obliquely in opposite directions each other.

6. The brake band according to claim 5, wherein said lining further includes a positioning hole and straight grooves which are disposed on both sides the positioning hole with respect to said axial direction, which extend in said circumferential direction of said lining, and which include a communication passage disposed at a leading end thereof with respect to said clockwise rotational direction of said drum.

7. The brake band according to claim 1, wherein said grooves are formed in a letter "V" shape which is disposed along said clockwise rotational direction of said drum so that an apex of the letter "V" shape trails fork ends thereof in said clockwise rotational direction of said drum, and include a communication passage which is disposed at the both fork ends of the letter "V" shape.

* * * * *